United States Patent [19]

Murayama et al.

[11] Patent Number: 5,118,273
[45] Date of Patent: Jun. 2, 1992

[54] COMPRESSION MOLDING APPARATUS

[75] Inventors: Kashiwa Murayama, Fujisawa; Masakazu Tatsuta; Nobu Utsunomiya, both of Hiratsuka, all of Japan

[73] Assignee: Japan Crown Cork Co., Ltd., Tokyo, Japan

[21] Appl. No.: 721,507

[22] PCT Filed: Dec. 5, 1990

[86] PCT No.: PCT/JP90/01582
§ 371 Date: Jul. 9, 1991
§ 102(e) Date: Jul. 9, 1991

[87] PCT Pub. No.: WO91/08888
PCT Pub. Date: Jun. 27, 1991

[30] Foreign Application Priority Data
Dec. 7, 1989 [JP] Japan .............. 1-316508

[51] Int. Cl.$^5$ .............. B29C 45/06; B29C 45/14; B29C 45/23
[52] U.S. Cl. .............. 425/126.1; 425/112; 425/145; 425/453; 425/557; 425/562
[58] Field of Search .............. 425/132, 145, 146, 147, 425/562, 453, 126.1, 127, 112, 557, 560, 382.3, 256, 259, 261, DIG. 201; 264/40.1

[56] References Cited

U.S. PATENT DOCUMENTS

| 3,709,644 | 1/1973 | Farrell | 425/560 |
| 4,784,819 | 11/1988 | Spurr | 425/560 |
| 4,867,665 | 5/1989 | Wada | 425/560 |
| 5,035,594 | 7/1991 | Murayama et al. | 425/261 |
| 5,071,339 | 12/1991 | Murayama et al. | 425/261 |

FOREIGN PATENT DOCUMENTS 57-178730  11/1982  Japan .
63-302010  12/1988  Japan .

Primary Examiner—Jay H. Woo
Assistant Examiner—Khanh P. Nguyen
Attorney, Agent, or Firm—Beveridge, DeGrandi & Weilacher

[57] ABSTRACT

A compression molding apparatus equipped with a rotary support member on which are mounted a plurality of molds. The molds are successively conveyed passing through a plastic material feed zone, a compression molding zone and a discharge zone by the rotation of said rotary support member. A plastic material feed device is disposed in said plastic material feed zone to feed a softened and molten plastic material to each of the molds. The plastic material feed device includes an extruder, an extruding block in which a plastic material flow path is formed, and a plastic material flow control device disposed between the extruder and the extruding block. The plastic material flow control device includes a main body that has an inlet path communicating with the extruder, a feed path communicating with the extruding block, and a discard path. The main body includes a control valve which is selectively located at a feed position at which the inlet path is shut off from the discard path and is communicated with the feed path, and at a discard position at which the inlet path is shut off from the feed path and is communicated with the discard path.

7 Claims, 8 Drawing Sheets

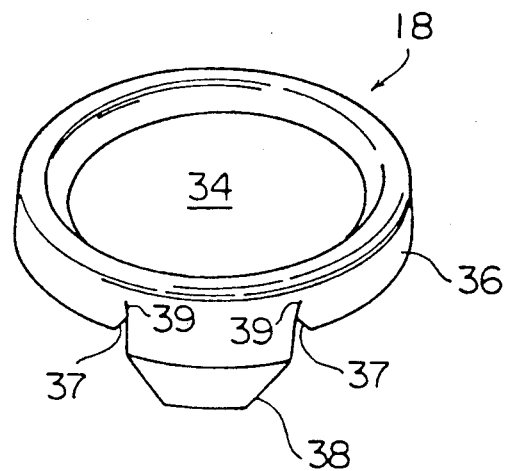
Fig. 2-A
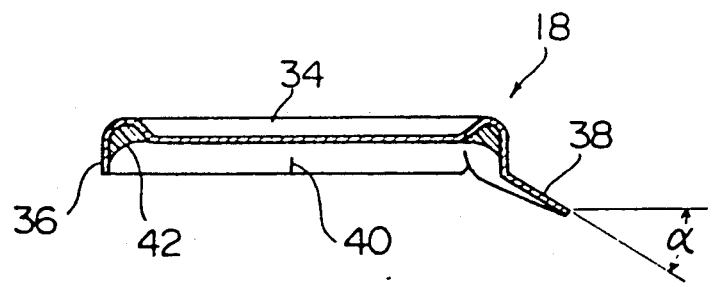
Fig. 2-B

Fig. 3-A
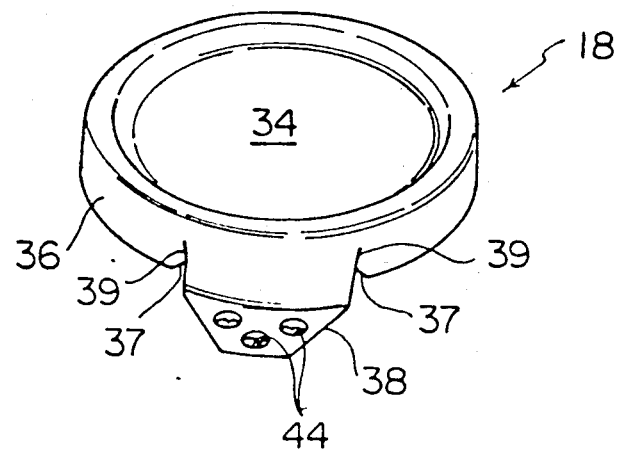
Fig. 3-B
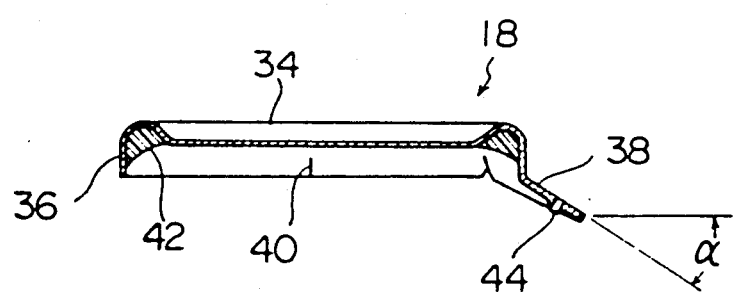

Fig.4-A
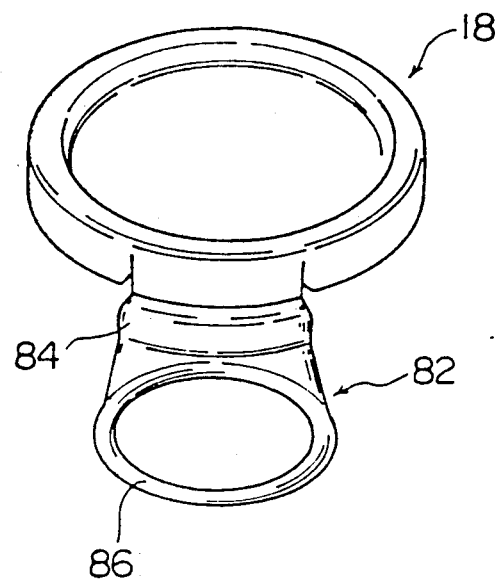
Fig.4-B
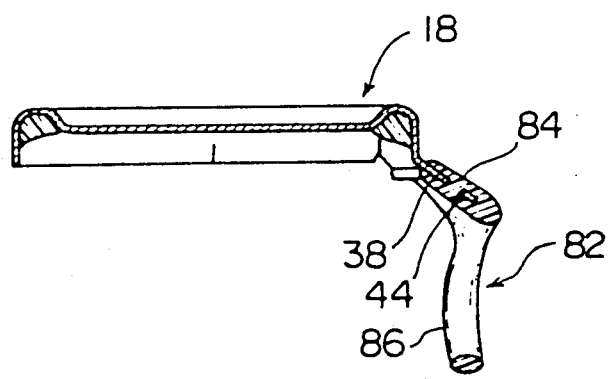

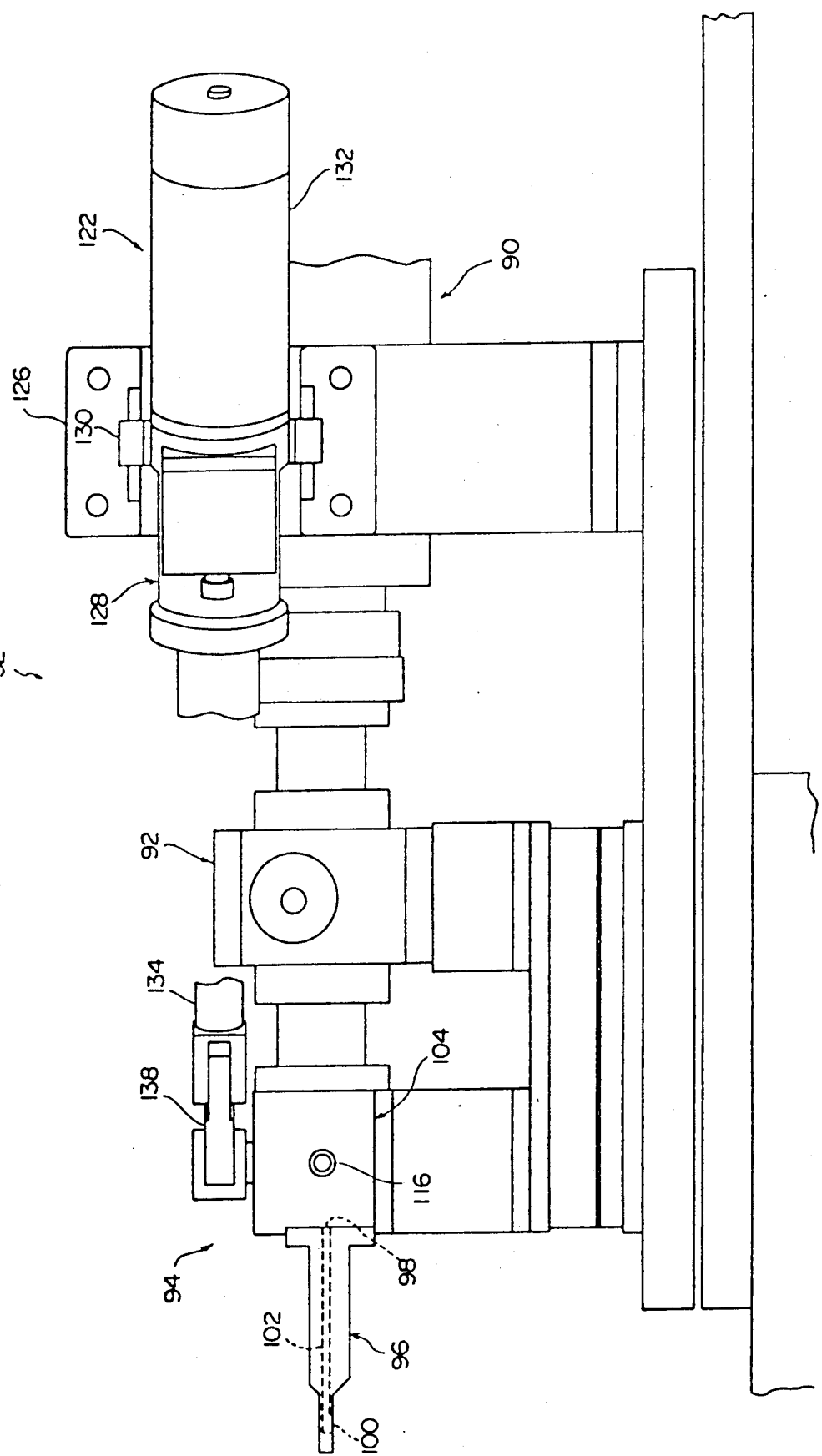

COMPRESSION MOLDING APPARATUS

TECHNICAL FIELD

The present invention relates to a compression molding apparatus, and particularly to a compression molding apparatus that can be favorably adapted to compression-molding a plastic grip ring and simultaneously linking it integrally to a linking protruding piece of a container closure body.

BACKGROUND ART

Japanese Laid-Open Patent Publication No. 178730/1982 discloses a container closure comprised of a metallic container closure body and a plastic grip ring as a suitable example of an easily openable container closure. The container closure body is made of a suitable thin metallic plate such as a thin aluminum-base alloy plate and has a circular top panel wall, a cylindrical skirt wall extending from the peripheral edge of the circular top panel wall, and a linking protruding piece protruding from part of the free end of the skirt wall. The plastic grip ring is integrally linked to the linking protruding piece of the container closure body.

Furthermore, Japanese Laid-Open Patent Publication No. 302010/1988 discloses a compression molding apparatus which compression-molds a plastic grip ring of a container closure of the above type and simultaneously links it integrally to a linking protruding piece of a container closure body. The above compression molding apparatus is equipped with a compression molding means that includes a rotary support member which is rotatably mounted, and a plurality of molds mounted on the rotary support member maintaining a distance in the circumferential direction. As the rotary support member rotates, the molds are successively conveyed via a plastic material feed zone, a container closure body feed zone, a compression molding zone and a discharge zone. The compression molding apparatus is further equipped with a plastic material feed means for feeding a heated and molten plastic material to each of the molds in the plastic material feed zone. The plastic material feed means is constituted by an extruding block having a plastic material flow path formed extending from a receiving port to a discharge port, and an extruder coupled to the extruding block. The discharge port of the extruding block is positioned in the plastic material feed zone, and the receiving port of the extruding block is communicated with an extruding port of the extruder. The heated and molten plastic material extruded from the extruder is discharged from the discharge port through the plastic material flow path in the extruding block, and is fed to the mold.

The conventional compression molding apparatus involves, however, the following problems that must be solved. The operation of the extruder is stabilized only after some periods of time (e.g., two to three minutes) have passed from the start of its operation in the plastic material feed means, and hence, the plastic material extruded from the extruder is not fully adapted to being compression-molded until the above periods of time have passed. Unacceptable products are produced if the compression molding is executed using such an unsuitable resin material. In the compression molding apparatus of the type mentioned above, furthermore, if the grip ring is compression-molded by feeding the plastic material under the condition where the container closure body has not been fed to the mold in the compression molding means, then the grip ring formed might be not discharged from the mold but remain therein. That is unacceptable situation. It is therefore desired that the plastic material extruded from the extruder is fed to the mold or is prevented from being fed to the mold in accordance with the necessity. However, the conventional compression molding apparatus could not satisfy such requirements. It is desired that the extruder is continuously operated from the standpoint of stability in its operation. Therefore, it is not allowed to control the feeding of plastic material by occasionally stopping the operation of the extruder.

DISCLOSURE OF THE INVENTION

The principal object of the present invention is to improve the plastic material feed means of a compression molding apparatus, so that the heated and molten plastic material extruded from the extruder is selectively fed to each of the molds as required without halting the operation of the extruder.

The gist of the present invention for achieving the above principal object resides in the arrangement of a plastic material flow control means of a particular form between a extruder in a plastic material feed means and an extruding block. Such plastic material flow control means must include a main body that has an inlet path communicating with an extruding port of the extruder, a feed path connected with a receiving port of the extruding block and a discard path, as well as a control valve that is selectively set at a feed position at which the inlet path is shut off from the discard path and is connected with the feed path and at a discard position at which said inlet path is shut off from the feed path and is connected with the discard path.

According to the present invention, there is provided a compression molding apparatus comprising a rotary compression molding means which includes a rotary support member that is rotatably mounted, and a plurality of molds mounted on said rotary support member maintaining a distance in the circumferential direction, such that said molds are successively conveyed passing through a plastic material feed zone, a compression molding zone, and a discharge zone by the rotation of said rotary support member, and a plastic material feed means for feeding a heated and molten plastic material to each of said molds in said plastic material feed zone; wherein said plastic material feed means includes an extruder, an extruding block having a plastic material flow path extending from a receiving port up to a discharge port positioned in said plastic material feed zone, and a plastic material flow control means interposed between said extruder and said extruding block; and said plastic material flow control means includes a main body that has an inlet path communicating with an extruding port of said extruder, a feed path communicating with said receiving port of said extruding block, and a discard path, and a control valve that is selectively set at a feed position at which said inlet path is shut off from said discard path and is connected with said feed path and at a discard position at which said inlet path is shut off from said feed path and is connected with said discard path.

It is preferable that when the control valve is shifted from the feed position to the discard position, the inlet path is shut off from the feed path after said inlet path has been connected with the discard path, and when the control valve is shifted from the discard position to the feed position, the inlet path is shut off from the discard path after said inlet path has been connected with the feed path.

Desirably furthermore, the main body of said flow control means has a cavity of the shape of a truncated cone, and said inlet path, said feed path and said discard path are connected with said cavity of the shape of a truncated cone maintaining a predetermined angle, said control valve has a valve member of the shape of a truncated cone inserted in said cavity of the shape of a truncated cone, a communication groove is formed in the outer peripheral surface of said valve member, and when said control valve is set at said feed position, the inlet path is connected with the feed path via said communication groove and when said control valve is set at said discard position, the inlet path is connected with the discard path via said communication groove.

According to the compression molding apparatus of the present invention, the control valve in the plastic material flow control means is set at the discard position when the plastic material should be blocked from being fed to the molds in such a case where the operation of the extruder is not stabilized or the container closure body is not fed to the molds. Then, the plastic material extruded from the extruder is caused to flow into the discard path from the inlet path of the plastic material flow control means and is blocked from being fed to the molds. The plastic material that flows through the discard path is collected in a suitable collection means and is fed again to the extruder, as required. When the plastic material is to be fed to each of the molds, the control valve of the plastic material flow control means is positioned at the feed position. This enables the plastic material extruded from the extruding machine to flow into the feed path from the inlet path of the plastic material flow control means, and then to be discharged from the discharge port flowing through the plastic material flow path of the extruding block continuing from the feed path so as to be fed to each of the molds.

BRIEF DESCRIPTION OF THE DRAWINGS

FIGS. 2-A and 2-B are a perspective and a sectional view of a container closure body before being pierced;

FIGS. 3-A and 3-B are a perspective and a sectional view of a container closure body pierced by using the piercing device of FIG. 1;

FIGS. 4-A and 4-B are a perspective and a sectional view of a container closure that has the container closure body and a plastic grip ring compression-molded by using the compression molding apparatus of FIG. 1;

FIGS. 5 and 6 are a plan and a side view showing a plastic material feed means used for the compression molding apparatus of FIG. 1;

BEST MODE FOR CARRYING OUT THE INVENTION

A preferred embodiment of the compression molding apparatus improved according to the present invention will now be described in detail with reference to the accompanying drawings.

Figure 1:
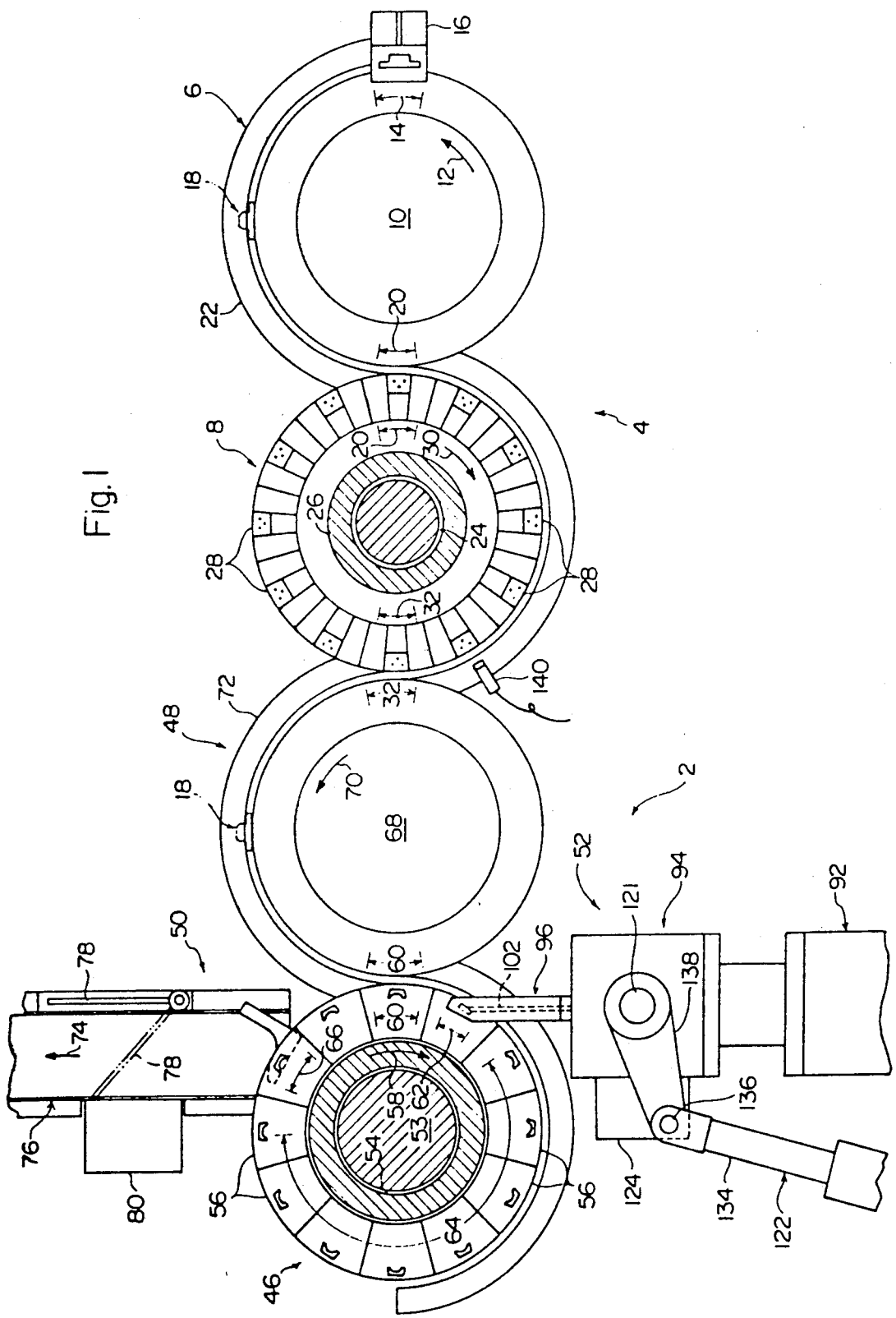
FIG. 1 is a simplified lateral sectional view showing a compression molding apparatus constructed in accordance with the present invention together with a piercing device.

FIG. 1 schematically illustrates a container closure-forming system which includes a compression molding apparatus that is generally designated at 2 and a piercing device that is generally designated at 4.

The piercing device 4 is constituted by a container closure body feed means 6 and a piercing means 8. The container closure body feed means 6 in the form of a rotary turret is equipped with a rotary disk 10 that is rotatably mounted to rotate about a center axis that extends substantially vertically (perpendicularly to the sheet surface in FIG. 1). In the outer peripheral surface of the rotary disk 10 that continuously rotates in a direction indicated by arrow 12 are formed a plurality of container closure body-receiving recesses (not shown) at an equal distance in the circumferential direction. While the rotary disk 10 is continuously rotated in a direction indicated by arrow 12, a container closure body 18 is fed to each of said receiving recesses from a feed chute 16 in a receiving zone designated at 14. The container closure body 18 is conveyed to a feed zone 20 with the turn of the rotary disk 10. During this period, the container closure body 18 is prevented from escaping outwardly in the radial direction from the receiving recess owing to a stationary guide 22 that arcuately extends from the receiving zone 14 to the feed zone 20 along the circumference of the rotary disk 10.

The piercing means 8 is equipped with a stationary support shaft 24 that extends substantially vertically and a rotary support member 26 that is rotatably mounted on the stationary support shaft 24. On the rotary support member 26 are arranged a plurality of container closure body-receiving plates 28 at an equal distance in the circumferential direction. Furthermore, a piercing tool assembly (not shown) is arranged to move up and down over each of the receiving plates 28 on the rotary support member 26. In the feed zone 20, the container closure body 18 is transferred from each of the receiving recesses of the rotary disk 10 in the container closure body feed means 6 to each of the receiving plates 28 arranged on the rotary support member 26 of piercing means 8. The rotary support member 26 of the piercing means 8 is continuously rotated in a direction indicated by arrow 30, and the container closure bodies 18 transferred to the receiving plates 28 in the feed zone 20 are conveyed to a discharge zone 32 from the feed zone 20 by the turn of the rotary support member 26. During this period, the piercing tool assembly acts on the container closure body 18 on the receiving plate 28 to perform the required piercing operation. In the discharge zone 32, the container closure body 18 subjected to the required piercing operation is transferred from the piercing means 8 to the compression molding apparatus 2.

FIGS. 2-A and 2-B illustrate one example of the container closure body 18 that is fed from the feed chute 16 to the piercing device 4 or, more specifically, to the container closure body feed means 6. The container closure body 18 may be made of a suitable thin metallic plate such as a thin aluminum-base alloy plate, a thin chromate-treated steel plate or a thin tin plate, and has a circular top panel wall 34, a cylindrical skirt wall 36 that extending downwardly from the peripheral edge of the top panel wall 34, and a linking protruding piece 38 that protrudes from part of the free end of the skirt wall 36. The linking protruding piece 38 may protrude from part of the free end of the skirt wall 36 in the axial direction or in a radial direction and substantially horizontally. Conveniently, however, the linking protruding piece 38 protrudes outwardly in the radial direction with downward inclination of an angle α which may be about 15 to about 60 degrees as shown. A nearly triangular notch 37 is formed in the skirt wall 36 on both sides of the base end of the linking protruding piece 38, and breakable lines 39 are formed extending upwardly from the notches 37. Furthermore, breakable lines 40 (FIG. 2-B) are formed to extend upwardly from the free end of the skirt wall 36 at both side portions at an angle of about 90 degrees in the circumferential direction as viewed from the center in the circumferential direction of the linking protruding piece 38. The breakable lines 39 and 40 may be so-called scores. The peripheral edge of the top panel wall 34 is ridged up, and a plastic annular liner 42 is disposed on the inside surface of the peripheral ridged edge. As clearly shown in FIGS. 3-A and 3-B, the linking protruding piece 38 of the container closure body 18 has one or a plurality of (e.g., three) holes 44 that are pierced by the piercing means 8 of the piercing device 4.

The above-mentioned piercing device 4 may be constructed as disclosed in Japanese Laid-Open Patent Publication No. 15237/1989 or as disclosed in the specification and drawings of Japanese Patent Application No. 121361/1989 (filed May 17, 1989, entitled "Piercing Device") filed by the present applicant. As for the details thereof, reference should be made to the above disclosures, and this specification does not describe them.

The description is continued with reference again to FIG. 1. The compression molding apparatus that is generally designated at 2 is comprised of a rotary compression molding means 46, a container closure body feed means 48, a discharge means 50, and in addition to these means a plastic material feed means 52 that is improved in accordance with the present invention.

To rotary compression molding means 46 includes a stationary support shaft 53 that extends substantially vertically (perpendicularly to the sheet surface in FIG. 1) and a rotary support member 54 rotatably mounted on the support shaft 53. On the rotary support member 54 are arranged a plurality of molds 56 (FIG. 1 shows only some of them) that are arranged on the rotary support member 54 at an equal distance in the circumferential direction. The rotary support member 54 continuously rotates in a direction indicated by arrow 58, so that the molds 56 are successively conveyed through a container closure body feed zone 60, a plastic material feed zone 62, a compression molding zone and a discharge zone 66.

The container closure body feed means 48 may be formed substantially in the same manner as the container closure body feed means 6 in the aforementioned piercing means 4, and is equipped with a rotary disk 68 that is mounted to rotate about a center axis that extends substantially vertically. In the outer peripheral surface of the rotary disk 68 that continuously rotates in a direction indicated by arrow 70 are formed a plurality of container closure body-receiving recesses (not shown) at an equal distance in the circumferential direction. While the rotary disk 68 continuously rotates in the direction indicated by arrow 70, the container closure bodies 18 that have holes 44 (FIGS. 3-A and 3-B) formed by the piercing means 8 of the aforementioned piercing device 4 are discharged from the piercing means 8 in the discharge zone 32 of the piercing device 4 and are fed to the receiving recesses of the container closure body feed means 48 in the compression molding apparatus 2. The container closure bodies 18 are conveyed to the feed zone 60 by the rotation of the rotary disk 68. During this period, the container closure bodies 18 are prevented from escaping outwardly in the radial direction from the receiving recesses owing to the stationary guide 72 that extends arcuately along the circumference of the rotary disk 68 from the discharge zone 32 up to the feed zone 60. In the feed zone 60, the container closure bodies 18 are transferred from the receiving recesses of the container closure body feed means 48 to the molds 56 in the rotary compression molding means 46.

In the plastic material feed zone 62, the heated and molten plastic material is fed to each of the molds 56 in the rotary compression molding means 46 by the plastic material feed means 52. The plastic material feed means 52 which is improved in accordance with the present invention will be described later in further detail. While the mold 56 fed with the container closure body 18 and then with the plastic material is conveyed passing through the compression molding zone 64, the plastic material is compression-molded into a required ring shape and is linked to the linking protruding piece 38 of the container closure body 18. In the discharge zone 66, the container closures provided with the plastic ring are discharged into the discharge means 50 from the molds 56 of the compression molding means 46. The discharge means 50 is constituted by a conveyor belt mechanism including an endless conveyor belt 76 that is driven in a direction indicated by arrow 74. Over the endless conveyor belt 74 is provided a switch lever 78 which is selectively positioned at a non-active position indicated by solid lines and at an active position indicated by two-dot chain lines. As will be described later in detail, when the container closure produced as desired is discharged onto the endless conveyor belt 76 from the mold 56 of the compression molding means 46, the switch lever 78 is positioned at the non-active position indicated by solid lines. In this case, the container closure discharged onto the endless conveyor checking, counting and packaging regions). On the other hand, when the container closure discharged onto the endless conveyor belt 76 from the mold 56 of the compression molding means 46 is an imperfect and unacceptable product, the switch lever 78 is positioned at the active position indicated by two-dot chain lines. In this case, the container closure discharged onto the endless conveyor belt 76 is not conveyed on the endless conveyor belt 76 but is introduced into a recovery box 80 by the action of the switch lever 78.

FIGS. 4-A and 4-B show the container closure having a plastic grip ring 82 that is molded as desired by the compression molding means 46. The grip ring 82 compression-molded from a suitable plastic material such as polypropylene or polyethylene has a base portion 84 and a ring-shaped portion 86 that downwardly extends from the base portion 84. The base portion 84 of the grip ring 82 surrounds the linking protruding piece 38 of the container closure body 18 and is integrally linked thereto. The plastic material from which the grip ring 82 is molded also flows into the holes 44 formed in the linking protruding piece 38 of the container closure body 18 and is cured, so that the grip ring 82 is fully firmly linked to the linking protruding piece 38.

Here, the rotary compression molding means 6 and the container closure body feed means 48 in the compression molding apparatus 2 shown in FIG. 1 may be those that are disclosed in Japanese Laid-Open Patent Publication No. 302010/1988 or those disclosed in the specification and drawings of Japanese Patent Application No. 279495/1988 (filed Nov. 7, 1968, entitled "Compression Molding Apparatus") filed by the present applicant. As for the details thereof, reference should be made to the above publication and application, and this specification does not describe them.

The invention will be further described with reference to FIGS. 5 and 6 as well as FIG. 1. The plastic material feed means 52 diagramed in the compression molding apparatus 2 is constituted by an extruder 90, a gear pump 92, a plastic material flow control means 94 and an extruding block 96. An extruder 90 which may be of the known rotary screw type is connected to the extruding block 96 via the gear pump 92 and plastic material flow control means 94. Similarly, the gear pump 92 which may be of the type known per se feeds the heated and molten plastic material extruded from the extruder 90 to the plastic material flow control means 94 and to the extruding block 96 while suitably compensating the variation in the amount of the extruded plastic material. The extruding block 96 extends substantially horizontally from the plastic material flow control means 94 up to the plastic material feed zone 62. In the extruding block 96 is formed a plastic material flow path 102 that extends from a receiving port 98 located at an upstream end thereof to a discharge port 100 located at a downstream end thereof. The discharge port 100 is opened downwardly in the plastic material feed zone 62. The heated and molten plastic material downwardly discharged from the discharge port 100 is cut and separated from the plastic material flow path 102 of the extruding block 94 by a plastic material receiving unit of the mold that moves passing through the plastic material feed zone 62 with the rotation of the rotary disk 68 in the compression molding means 46, and thus, is fed to the mold 56 (in this regard, reference should be made, if necessary, to the specification and drawings of the above Japanese Laid-Open Patent Publication No. 302010/1988 or the above Japanese Patent Application No. 279495/1988).

Figure 5:
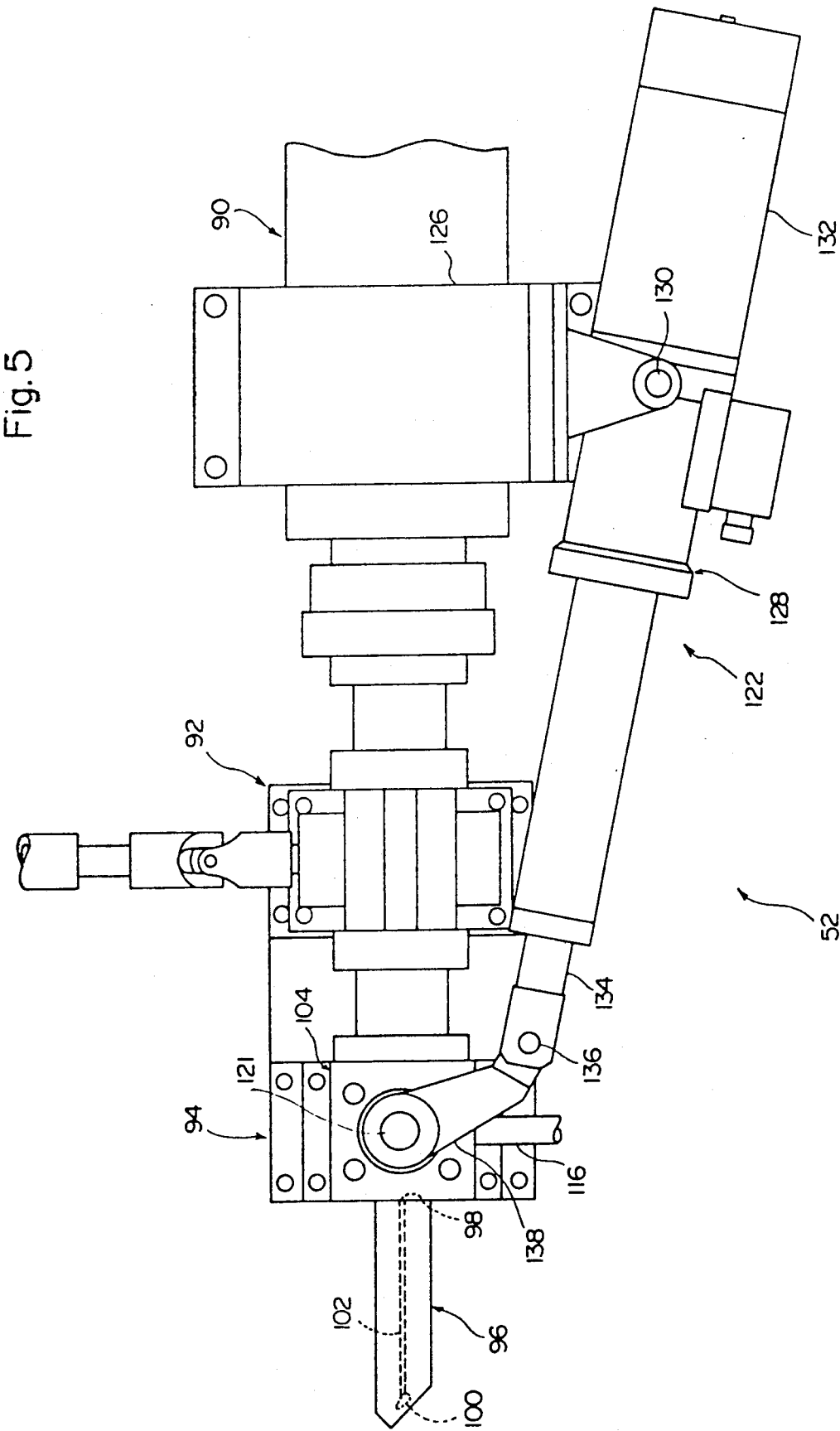
Figure 8:
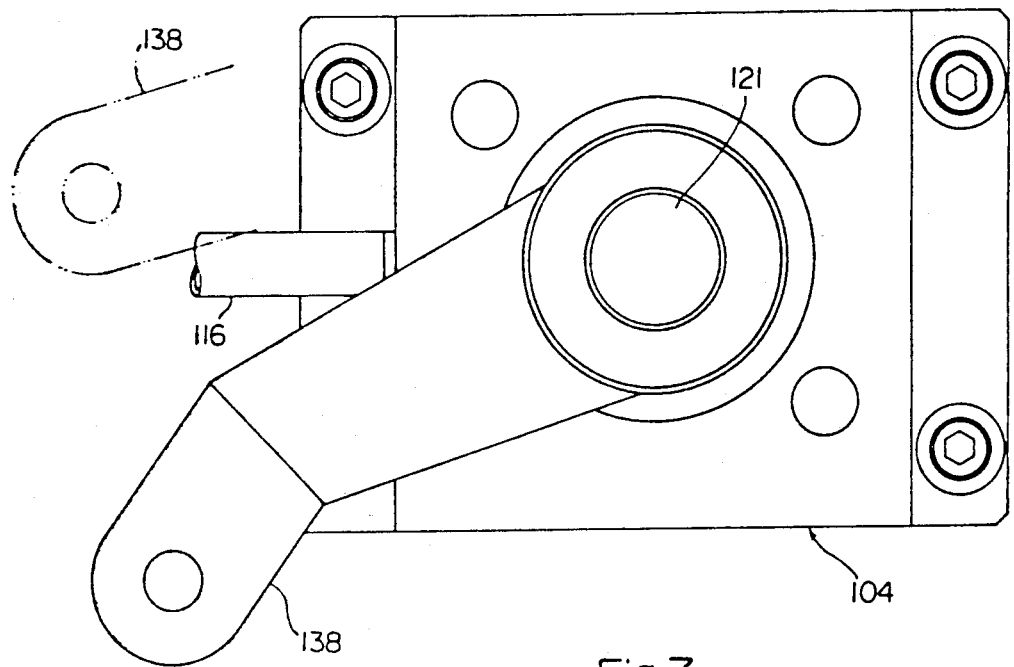
FIGS. 7 and 8 are a plan and a vertical sectional view showing a plastic material flow control means in the plastic material feed means.
Figure 7:
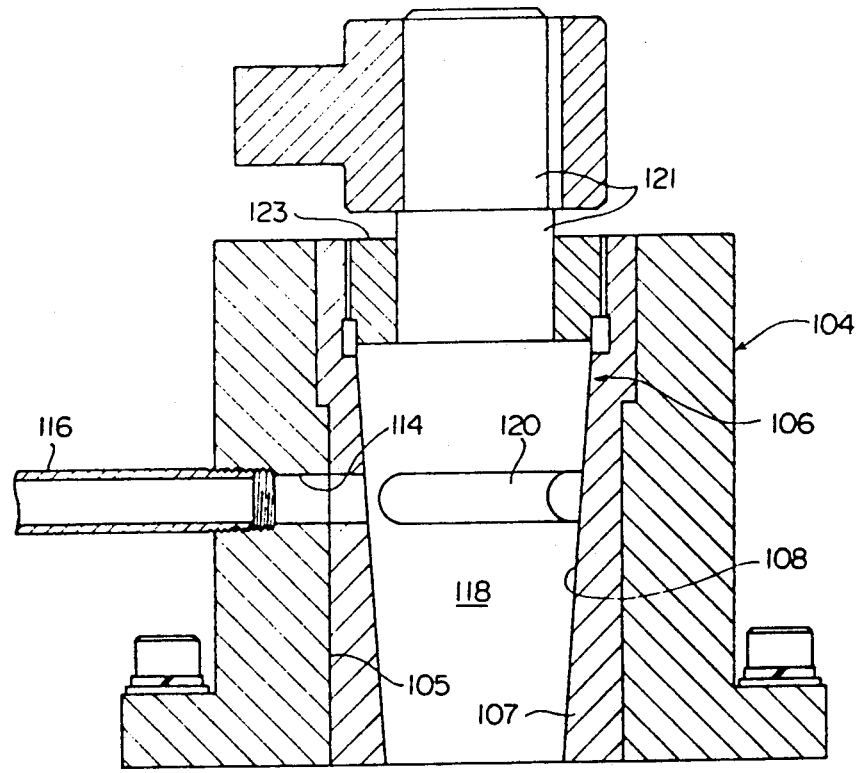

If the description is further continued with reference to FIGS. 7 to 10 as well as FIG. 1, FIG. 5, FIG. 6, the plastic material flow control means 94 includes a main body 104 secured to a predetermined position by the clamping bolts arranged at four corner portions and a control valve 106 mounted in the main body. As will be clearly understood with reference to FIGS. 7 and 9, a through hole 105 which may have a circular shape in cross section is formed at the central portion of the main body 104 in the up-and-down direction. A cylindrical insertion member 107 is inserted in the through hole 105, and a cavity 108 having a shape of a truncated cone is formed by &he inner peripheral surface of the insertion member 107. In the main body 104 are further formed three paths, i.e., inlet path 110, feed path 112 and discard path 114 that stretch radially from the cavity 108 having the shape of a truncated cone. The inlet path 110 and the feed path 112 are arranged maintaining an angular interval of about 180 degrees relative to each other, and the discard path 114 is arranged at a position midway between the inlet path 110 and the feed path 112. The inlet path 110 is connected to a outlet port of the gear pump 92, and the plastic material fed from the extruding machine 90 through the gear pump 92 is caused to flow into the inlet path 110 of the main body 104 in the plastic material flow control means 94. The feed path 112 formed in the main body 104 of the plastic material flow control means 94 is connected to the receiving port 98 of the plastic material flow path 102 formed in the extruding block 96. A discharge pipe 116 is connected to the discard path 114. As will be understood with reference to FIGS. 7 and 9, the control valve 106 is constituted by a valve member 118 having the shape of a truncated cone that corresponds to the cavity 108 having the shape of a truncated cone of the main body 104. The main portion of the valve member 118 having the shape of a truncated cone is rotatably accommodated in the cavity 108 having the shape of a truncated cone of the main body 104. In the outer peripheral surface of the main portion of the valve member 118 having the shape of a truncated cone is formed a communication groove 120 extending in the circumferential direction over an angular range of about 260 degrees. The valve member 118 having the shape of a truncated cone has a protruded axle portion 121 of a relatively small diameter that extends upwardly. The upper end of the protruded axle portion 121 upwardly protrudes beyond the upper surface of the main body 104, and is linked to a control valve positioning means 122. A closing member 123 is disposed to surround the protruded axle portion 121 of the valve member 118 having the shape of a truncated cone over the surface of the main body 104. The closing member 123 is screwed to the upper end of the insertion member 107. The control valve positioning means 122 selectively positions the valve member 118 having the shape of a truncated cone at the feed position shown in FIG. 9 and at the discard position shown in FIG. 10. When the valve member 118 having the shape of a truncated cone is positioned at the feed position shown in FIG. 9, the inlet path 110 and the feed path 112 of the main body 104 are communicated with each other via the communication groove 120 of valve member 118 having the shape of a truncated cone. Consequently, the heated and molten plastic material fed from the extruding machine 90 via gear pump 92 is further conveyed to the plastic material flow path 102 of the extruding block 96 via inlet path 110, communication path 120 and feed path 112, and is discharged from the discharge port 100 of the extruding block 96 so as to be fed to the mold 56 in the compression molding means 46. On the other hand, as the valve member 118 having the shape of a truncated cone is positioned at the discard position shown in FIG. 10, the inlet path 110 and the discard path 114 of the main body 104 are communicated with each other via the communication groove 120 of valve member 118 having the shape of a truncated cone. Consequently, the heated and molten plastic material fed from the extruding machine 90 via gear pump 92 flows passing through the inlet path 110, communication groove 120 and discard path 114, and is discharged from the discharge pipe 116. The plastic material discharged from the discharge pipe 116 is collected on the collection box 124 (FIG. 1). The plastic material collected in the collection box 124 can be fed again to the extruder 90, as required. As will be understood from the comparison of FIG. 9 with FIG. 10, when the valve member 118 having the shape of a truncated cone is clockwise turned in FIG. 9 and is shifted from the feed position to the discard position, the inlet path 110 is partly communicated with the discard path 114 via the communication groove 120 and, then, the feed path 112 is shut off from the communication groove 120, i.e., shut off from the inlet path 110. When the valve member 118 having the shape of a truncated cone is counterclockwisely turned in FIG. 10 and is shifted from the discard position to the feed position, the inlet path 110 is partly communicated with the feed path 112 via the communication groove 120 and, then, the discard path 114 is shut off from the communication groove 120, i.e., shut off from the inlet path 110. Being constituted as described above, the path of the plastic material flowing through the outlet port of the gear pump 92 into the inlet path 110 is not closed even temporarily, making it sure to inhibit formation of considerably high pressure even temporarily on the upstream side of the plastic material flow control means 94 or on the downstream side of the gear pump 92.

If further described with reference to FIGS. 5 and 6, a mounting bracket 126 is secured to the casing of the extruder 90. A casing 128 of the control valve positioning means 122 is swingably mounted on the bracket 126 by a coupling pin 130. A reversible electric motor 132 is mounted on one end (right end in FIGS. 5 and 6) of the casing 128. The output shaft of the electric motor 132 is coupled to an output shaft 134 via a transmission worm gear mechanism (not shown) equipped inside the casing 128. The end of the output shaft 134 slidably mounted in the casing 128 is swingably linked to an end of a valve drive member 138 by a coupling pin 136. The other end of the valve drive member 138 is secured to the valve member 118 having the shape of a truncated cone. Under the condition shown in FIGS. 5 and 6, when the electric motor 132 is forwardly rotated by a predetermined amount, the output shaft 134 stretches out, whereby the valve member 118 having the shape of a truncated cone clockwisely rotates in FIG. 5 and is positioned at the discard position shown in FIG. 10. When the electric motor 132 is reversely rotated by a predetermined amount under the condition where the valve member 118 having the shape of a truncated cone is at the discard position shown in FIG. 10, the output shaft is contracted to a position shown in FIG. 5, whereby the valve member 118 having the shape of a truncated cone is rotated in the counterclockwise direction in FIG. 10 and is positioned at the feed position in FIGS. 5 and 9.

The electric motor 132 of the control valve positioning means 122 is suitably rotated forwardly or reversely in relation with stabilization or the like of the operation of the extruder 90. The valve member 118 having the shape of a truncated cone remains located at the discard position shown in FIG. 10 until a predetermined period of time has passed after the start of operation of the extruder 90 or, in other words, until the operation of the extruder 90 is stabilized and the extruded plastic material acquires the state adapted to being compression-molded. Therefore, the plastic material is not fed to the molds 56 in the compression molding means 46. During this period, the container closure body 18 that is fed to the compression molding means 46 is discharged from the compression molding means 46 as an unacceptable product that has not plastic grip ring, and is introduced into the recovery box 80 by the action of the switch lever 78 that is located at the active position indicated by a two-dot chain line in FIG. 1 (reference should also be made to FIGS. 4-A and 4-B in addition to FIG. 1).

Figure 9:
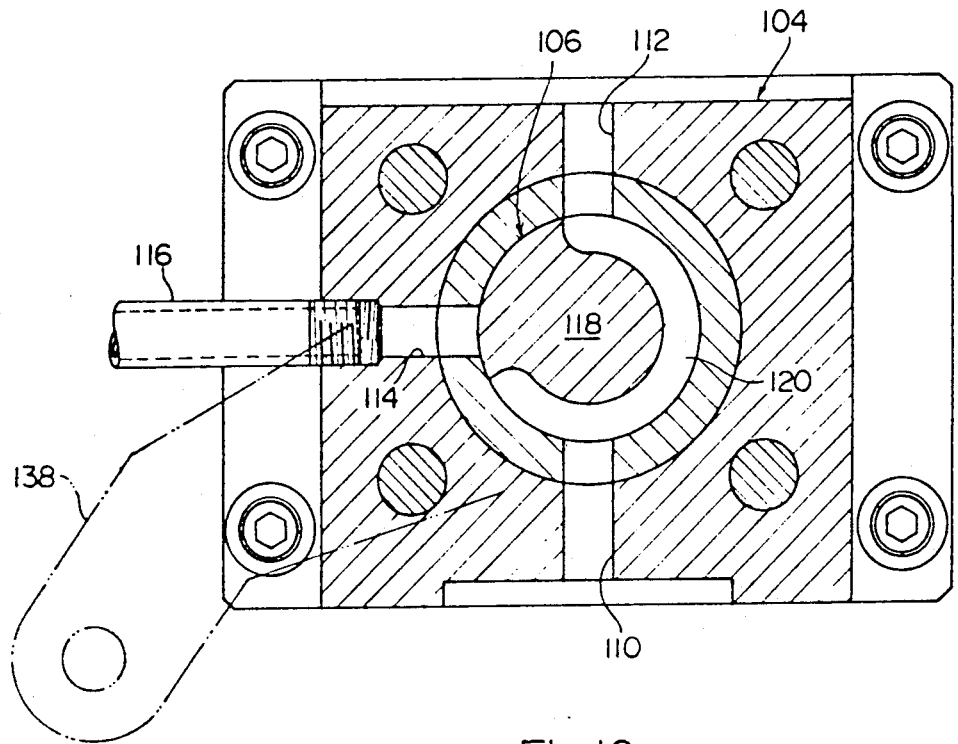
FIGS. 9 and 10 are lateral sectional views showing conditions where the control valve of the plastic material flow control means of FIGS. 7 and 8 is at the feed position and at the discard position.
Figure 10:
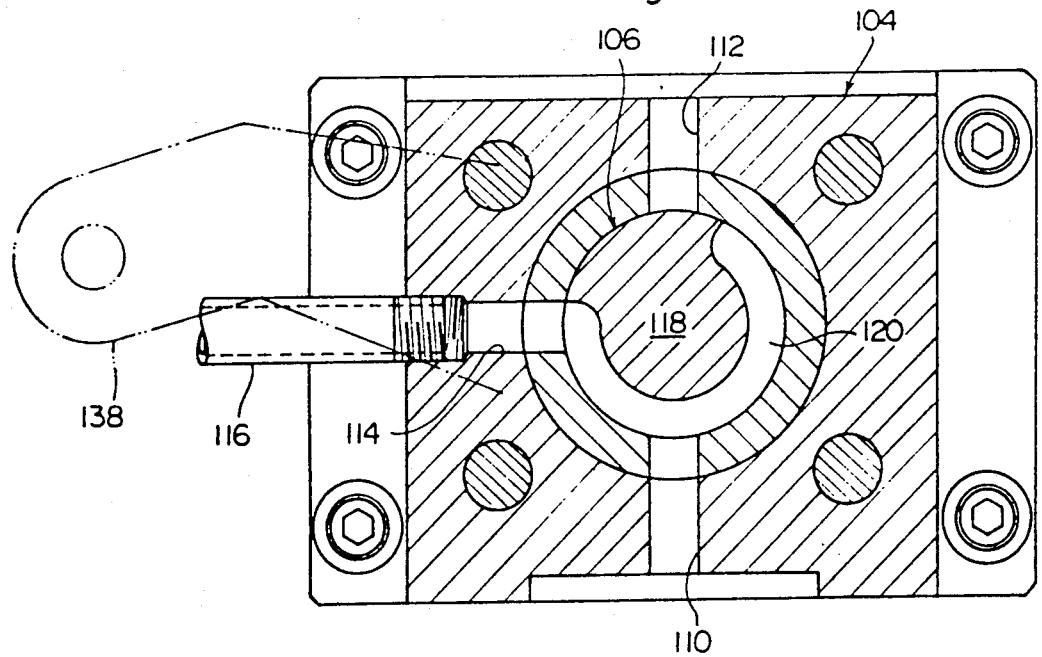

When the operation of the extruder 90 becomes stabilized, the electric motor 132 is reversely rotated and the valve member 118 having the shape of a truncated cone is located at the feed position shown in FIG. 9. Then, the plastic material starts to be fed to the molds 56 of the compression molding means 46, and the container closure body 18 to which has been coupled the plastic grip ring 46 that has been molded as required is discharged from the compression molding means 46. As shown in FIG. 1, a container closure body detecting means 140 is disposed in relation to the rotary support member 26 of the piercing means 8. The container closure body detecting means 140 that may be constituted by a photoelectric detector or the like, detects whether the container closure body 18 is present in each of the container closure body-receiving plates 28 arranged on the rotary support member 26 of the piercing means 8. When no container closure body 18 exists on the container closure body-receiving plate 28, the valve member 118 having the shape of a truncated cone in the plastic material feed means 52 is shifted to the discard position shown in FIG. 10 involving some suitable delay in time, and the plastic material is interrupted from being fed to the mold 56 in the compression molding means 46.

Using the compression molding apparatus improved according to the present invention, the heated and molten plastic material extruded from the extruding machine can be selectively fed to the molds in the compression molding means by suitably operating the plastic material flow control means without stopping the operation of the extruding machine. Therefore, it is made possible to reliably prevent unexpected production of unacceptable products and to prevent the plastic material from remaining in the molds that must be avoided by all means.

We claim:

1. A compression molding apparatus comprising a rotary compression molding means which includes a rotary support member that is rotatably mounted, and a plurality of molds mounted on said rotary support member maintaining a distance in the circumferential direction, such that said molds are successively conveyed passing through a plastic material feed zone, a compression molding zone, and a discharge zone by the rotation of said rotary support member, and a plastic material feed means for feeding a heated and molten plastic material to each of said molds in said plastic material feed zone; wherein said plastic material feed means includes an extruder, an extruding block having a plastic material flow path extending from a receiving port up to a discharge port positioned in said plastic material feed zone, and a plastic material flow control means interposed between said extruder and said extruding block; and said plastic material flow control means includes a main body that has an inlet path communicating with an extruding port of said extruder, a feed path communicated with said receiving port of said extruding block, and a discard path, and a control valve that is selectively set at a feed position at which said inlet path is shut off from said discard path and is connected with said feed path and at a discard position at which said inlet path is shut off from said feed path and is connected with said discard path.

2. A compression molding apparatus according to claim 1, wherein when said control valve is shifted from said feed position to said discard position, said inlet path is shut off from said feed path after said inlet path has been connected with said discard path, and when said control valve is shifted from said discard position to said feed position, said inlet path is shut off from said discard path after said inlet path has been connected with said feed path.

3. A compression molding apparatus according to claim 1, wherein said main body of said flow control means has a cavity of the shape of a truncated cone, and said inlet path, said feed path and said discard path are connected with said cavity of the shape of a truncated cone maintaining a predetermined angle, said control valve has a valve member of the shape of a truncated cone inserted in said cavity of the shape of a circular truncated cone, a communication groove is formed in the outer peripheral surface of said valve member, and when said control valve is set at said feed position, said inlet path is connected with said feed path via said communication groove and when said control valve is set at said discard position, said inlet path is connected with said discard path via said communication groove.

4. A compression molding apparatus according to claim 1, wherein said plastic material flow control means includes a control valve positioning means which selectively positions said control valve at said feed position or at said discard position.

5. A compression molding apparatus according to claim 4, wherein said control valve positioning means is constituted by an electric motor.

6. A compression molding apparatus according to claim 1, wherein said plastic material feed means includes a gear pump that is interposed between said extruder and said plastic material flow control means.

7. A compression molding apparatus according to claim 1, wherein a container closure body feed zone exists on the downstream side of said discharge zone but on the upstream side of said compression zone as viewed in a direction in which said rotary member rotates, a container closure body feed means is disposed in said container closure body feed zone to feed to each of said molds a container closure body that has a circular top panel wall, a cylindrical skirt wall extending from the peripheral edge of said top panel wall and a linking protruding piece that protrudes from part of the free end of said skirt wall, and a plastic grip ring is compression-molded in said molding zone and is simultaneously integrally linked to said linking protruding piece of said container closure body.

* * * * *